US005513100A

United States Patent [19]
Parker et al.

[11] Patent Number: 5,513,100
[45] Date of Patent: Apr. 30, 1996

[54] VELOCITY CONTROLLER WITH FORCE FEEDBACK STIFFNESS CONTROL

[75] Inventors: Niall R. Parker, Abbotsford; Peter D. Lawrence; Septimiu E. Salcudean, both of Vancouver, all of Canada

[73] Assignee: The University of British Columbia, Vancouver, Canada

[21] Appl. No.: 74,645

[22] Filed: Jun. 10, 1993

[51] Int. Cl.⁶ .................................................. G06F 19/00
[52] U.S. Cl. .................. 364/167.01; 395/95; 318/568.18; 318/568.22; 901/9
[58] Field of Search ............................ 901/8, 9, 15, 49; 318/568.1–568.25; 414/730, 909, 1–8; 364/157.01, 174; 395/80–97

[56] References Cited

U.S. PATENT DOCUMENTS

| | | | |
|---|---|---|---|
| 4,603,284 | 7/1986 | Perzley | 318/568 |
| 4,874,998 | 10/1989 | Hollis, Jr. | |
| 5,019,761 | 5/1991 | Kraft | 318/568.11 |
| 5,046,022 | 9/1991 | Conway | 364/190 |
| 5,086,401 | 2/1992 | Glassman et al. | 395/94 |
| 5,116,180 | 5/1992 | Fung et al. | 901/8 |
| 5,206,930 | 4/1993 | Ishikawa et al. | 395/95 |
| 5,341,459 | 8/1994 | Backes | 395/95 |

Primary Examiner—Roy N. Envall, Jr.
Assistant Examiner—Thomas E. Brown
Attorney, Agent, or Firm—C. A. Rowley

[57] ABSTRACT

A force feedback velocity control measures the forces adjacent the end point of an arm being controlled and adjusts the stiffness of a manual controller in any one direction by scaling the end point force in the corresponding direction and adjusting the scaled force based on the degree of displacement of the manual controller away from a datum or zero velocity position in the one direction. A suitable deadband zone is provided surrounding the datum position.

12 Claims, 3 Drawing Sheets

VELOCITY CONTROLLER WITH FORCE FEEDBACK STIFFNESS CONTROL

FIELD OF THE INVENTION

The present invention relates to an improved force feedback velocity control system, more particularly the present invention relates to a force feedback velocity control wherein stiffness of the manual controller is adjusted to apply a feedback force.

BACKGROUND TO THE INVENTION

Force feedback is used primarily with position control systems wherein the position of a master is mapped to correspond with the position of the slave. In these systems the forces adjacent to an endpoint on the arm being controlled are determined or sensed and corresponding scaled forces are applied to the master or hand control so that the operator is subjected to an indication of the forces on the endpoint based on the scaled forces which the operator must overcome or otherwise accommodate in moving the master to obtain the desired movement of the slave.

The concept of force feedback in conjunction with a velocity control system wherein the velocity of an end point is controlled in any direction by the degree of displacement of a manual controller (master) in a corresponding direction has been suggested, but has not proved successful.

U.S. Pat. No. 5,116,180 issued May 26, 1992 to Fung et al. discloses both a position control system and a velocity control system each of which when operated in the active mode applies force feedback to the master which reflect or represent in some manner the forces applied at the end point.

When this system is operated in the active mode as a velocity or rate controller the scaled forces applied to the hand controller are a function solely of the actual force applied at the end point and as a result the operation is unstable, produces an unnatural feel to the operator and is difficult to use. The velocity controller master (joystick) is biased to its datum or neutral position ($d_m=0$), wherein no velocity signals are generated, by a spring force the magnitude of which changes solely with degree of displacement from the datum. However, the same force feedback force (scaled from the end point force) is applied to the master for a given end point force regardless of the displacement of the master, so that the portion of the force felt by the operator generated by the forces at the endpoint for a small displacement of the hand controller will be significantly larger than for a larger displacement and thus the components of the force felt by the operator change significantly with displacement of the master. As a result, the sensations received by the operator are not clearly representative of the environment of the endpoint (i.e. forces on the endpoint) being controlled and thus may be are confusing to the operator. Furthermore the force applied to the master as the datum is reached are likely to result instability in that the force applied may well tend cause the control to overshoot the datum, which in turn requires the application of large damping forces be applied to the master and these damping forces further mask the feedback forces.

BRIEF DESCRIPTION OF THE INVENTION

It is an object of the present invention to provide a stable velocity control system incorporating force feedback.

It is a further object of the invention to provide a force feedback velocity control system wherein the forces at the endpoint of the arm being controlled are scaled and modified in accordance with the displacement of the master from its datum position before being applied as feedback force to the master.

Broadly the present invention relates to a method for applying force feedback to a velocity control system for an arm having an end point, said method of controlling the velocity of said endpoint comprising determining the degree of displacement of a manual control member from a datum position wherein no velocity commands are provided to move the arm, said displacement defining the velocity signal desired by the operator, determining forces at said end point, defining a stiffness factor based on said determined forces at said end point, applying stiffness feedback forces to said manual control member based on said stiffness factor and said degree of displacement of said manual control member from said datum position while always applying a biasing force to said member biasing said member to said datum position when said member is moved from said datum position.

Preferably said stiffness factor is obtained by scaling said measured end point forces.

Preferably a deadband zone wherein movement of said manual member does not signal for a corresponding change in velocity of said end point will encircle said datum position.

Broadly the present invention relates to a force feedback velocity control system for an arm having an end point comprising a computer means, a master controller means having a manual displaceable member, said master controller mapped to provide a datum position wherein no velocity signals are sent to said computer when said member is in said datum position and to adjust the velocity signal to said computer means to increase the velocity of said endpoint in any one direction in an amount dependent on the degree of displacement of said displaceable member from said datum position in the direction of movement of said member controlling movement of said end point in said one direction, means for applying stiffness to resist movement of said member away from said datum position, means to provide signals representing forces on said arm adjacent said end point, means to generate force feedback signals based on said forces on said arm, means for modifying the forces applied by said means for applying stiffness in said direction of movement controlling velocity of said end point in said one direction based on said force feedback signals representative of said force on said arm in said one direction in accordance with displacement of said member from said datum in said direction of movement of said member controlling velocity of said end point in said one direction.

Preferably a deadband zone in which movement of said master produces no changes in velocity of said end point encircles said datum position.

BRIEF DESCRIPTION OF THE DRAWINGS

Further features, objects and advantages will be evident from the following detailed description of the present invention taken in conjunction with the accompanying drawings in which.

DESCRIPTION OF THE PREFERRED EMBODIMENTS

The present invention may be applied to any suitable piece of equipment operated on velocity control wherein the velocity of an endpoint to be moved is dependent on the displacement of a hand control such as a joystick from its datum (usually its centre position).

Figure 1:
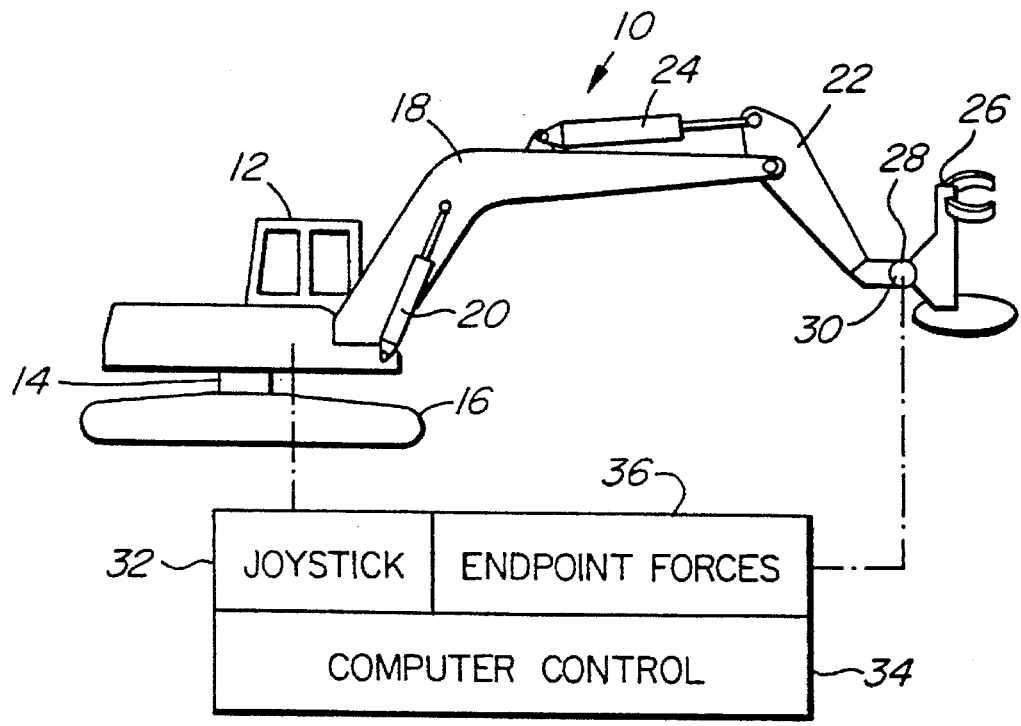
FIG. 1 is a simplified view of a typical arm to which the present invention may be applied.

As shown in FIG. 1 the present invention may be applied to a feller/buncher 10 having a cab 12 mounted for rotational movement on axle 14 mounted on a platform (not shown) which in turn is mounted on tracks which move the machine 10 to its desired position. The feller/buncher 10 has a boom 18 pivotably mounted from the cab 12 and moved relative to the cab 12 via a hydraulic cylinder 20. A stick 22 is pivotably mounted to the free end of the boom 18 and is moved relative to the boom 18 via a hydraulic cylinder 24. A felling head 26 is mounted for relative movement on the free end of the stick 22. For the purposes of this description the end point the movement of which is to be controlled is indicated at 28 (the connection of the feller head 26 with the boom 22) and the forces on the endpoint are sensed by a suitable sensor 30 normally positioned adjacent the end point 28.

The forces at the end point 28 may be determined by sensor 30 which may be any suitable known sensor or may be determined by sensing the forces applied to the various arm segments e.g. boom 18 and stick 22 and calculating the forces.

The operator not shown manipulates a suitable control such as the joystick 32 to set the desired velocity of the end point in the various x, y, or z directions based on displacement of the joystick from a datum position in the respective direction of movement of the joystick that controls the velocity of the end point in the desired direction. This information is provided as input to the control computer 34.

A manual controller for use with the present invention may take the form of the controller shown in the above referenced U.S. Pat. No. 5,116,280 or the magnetic levitation device shown in U.S. Pat. No. 4,874,998 issued Oct. 17, 1989 to Hollis Jr. or as described in co-pending U.S. patent application Ser. No. 07/943,022 filed Sep. 10, 1992 by Salcudean et al all of which are incorporated herein by reference.

Figure 2:
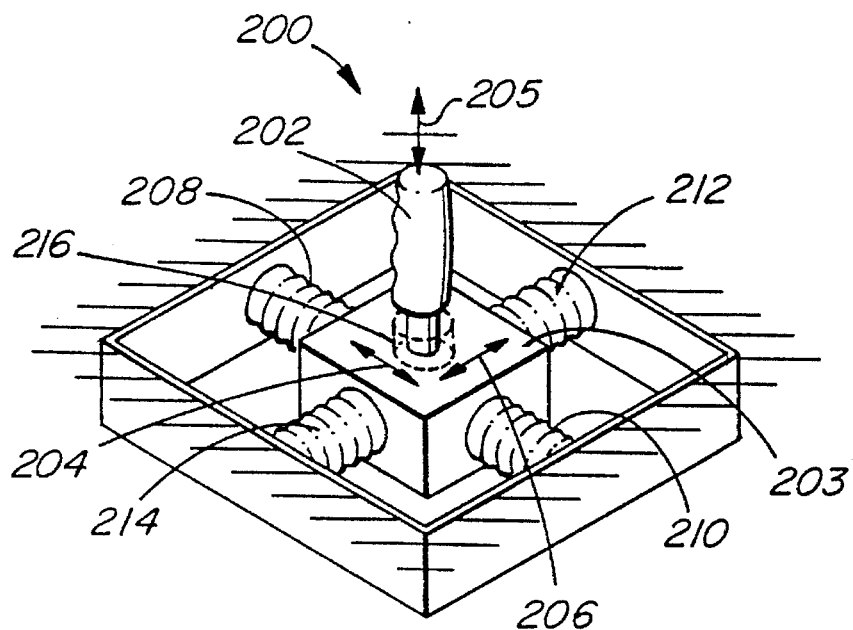
FIG. 2 is a simplified representation of a hand controller for force feedback velocity control

For purposes of illustration a hand controller 200 (joystick 32) is illustrated schematically in FIG. 2 and is provided with a hand control member 202 that is grasped and manipulated by an operator (not shown). The illustrated hand control member 202 may move in three mutually perpendicular directions as indicated by the arrows 204, 205 and 206. The movements are monitored (measured) and forces applied to the member 202 through the base 203 by devices 208, 210, 212 and 214 which may function as a magnetic levitation devices, pneumatic bellows etc. to bias the member 202 to its datum or centred position as illustrated and to apply forces to the base 203 on which the member 200 is mounted that must be overcome to move the member 202. These forces are defined as will be described below based on the forces at the end point of the arm being controlled and the degree of displacement of the member 202 from its datum position.

As will be described below the member 202 has a deadband zone in which movement of the member 202 does not provide signals that result in movement of the end point 28 of the arm. This deadband space or zone has schematically been shown by the dash line 216 in FIG. 2.

Figure 3:
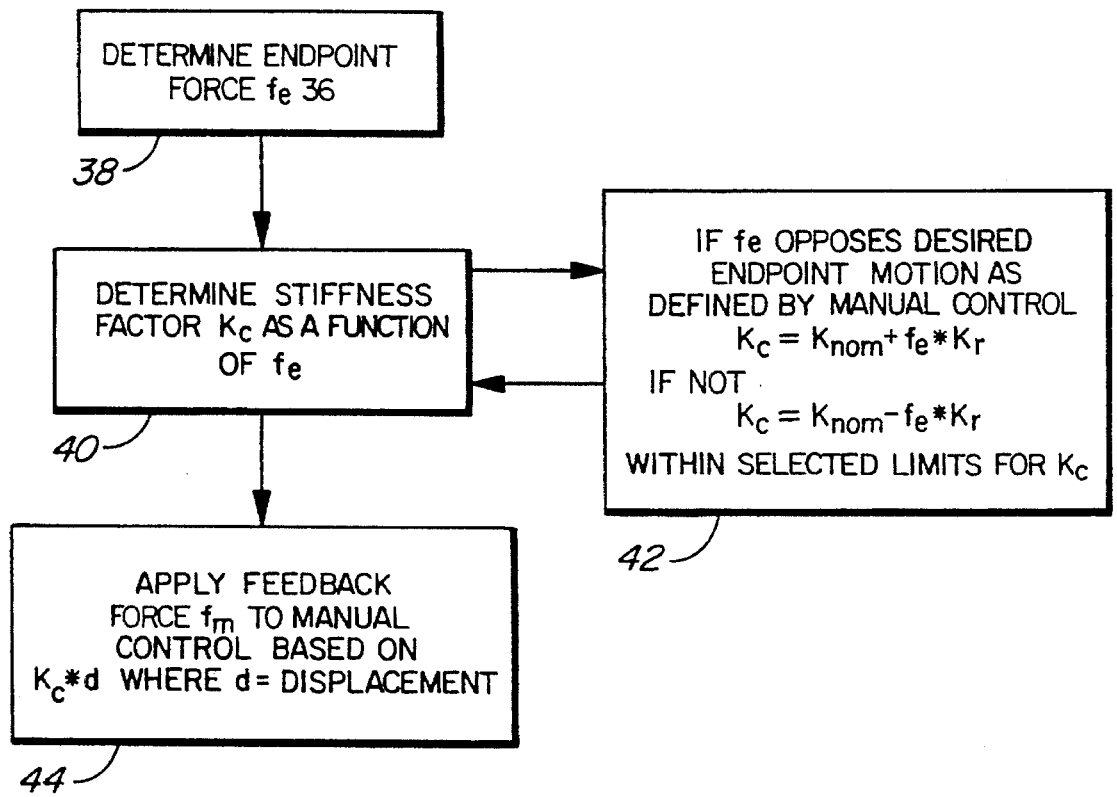
FIG. 3 is a flow diagram of the force feedback portion of a control system based on the present invention.

The sensor 30 (FIG. 1) or its equivalent provides signals indicative of the force applied to the endpoint that are converted to end point forces by the computer 34 as indicated at 36 and this information is thus available in the computer 34 (see block 38 of FIG. 3). Based on this information the stiffness factor $K_c$ is determined as a function of the forces on the end point 28 $f_e$ as indicated at 40. The stiffness factor $K_c$ may be obtained, for example, by simply scaling the corresponding end point force. The factor $K_c$ obviously must accommodate forces resisting movement of the end point 28 in its desired direction of movement as defined by the joystick 32 inputs so that (see box 42 of FIG. 3 and FIG. 4) if the sensed force $f_e$ resists movement in the desired direction the factor $K_c$ will follow the relationship;

$$K_c = K_{nom} + f_e * K_r \qquad (1)$$

where $K_c$=stiffness factor.

$K_{nom}$=stiffness factor tending force the hand control to its datum position under conditions where the end point force is zero.

$f_e$=endpoint force in the direction being controlled.

$K_r$=scaling factor by which $f_e$ is changed to define the stiffness factor.

or if the sensed force $f_e$ tends to move the end point 28 in the desired direction the factor $K_c$ will follow the relationship;

$$K_c = K_{nom} - f_e * K_r \qquad (2)$$

The scaling factor $K_r$ is based on the actual forces that are applied at the end point 28 and the amount of force feedback that is desired to be applied at the master or joystick over the range of forces applied to the endpoint. Thus a different scaling factor $K_r$ may be selected depending on the master controller being used and the range of forces $f_e$ to which the end point 28 is likely to be subjected.

Obviously the value for $K_c$ must never be zero as there will always be a stiffness force tending to return the joystick to its neutral or datum position (see FIG. 2) wherein no velocity signal is sent to the computer and the arm of the machine 10 is stationary and should not exceed a preselected practical limit for the maximum stiffness force to be applied to the joystick. These minimum and maximum forces to be applied at the master controller or joystick are dependent on the minimum and maximum stiffness factors indicated in FIG. 4 at $K_{min}$ and $K_{max}$. The actual forces on the joystick are also dependent on the displacement d of the hand controller or joystick as will be described below i.e. the maximum feedback stiffness force $f_{m(max)} = d_{(max)} * K_{max}$.

Figure 4:
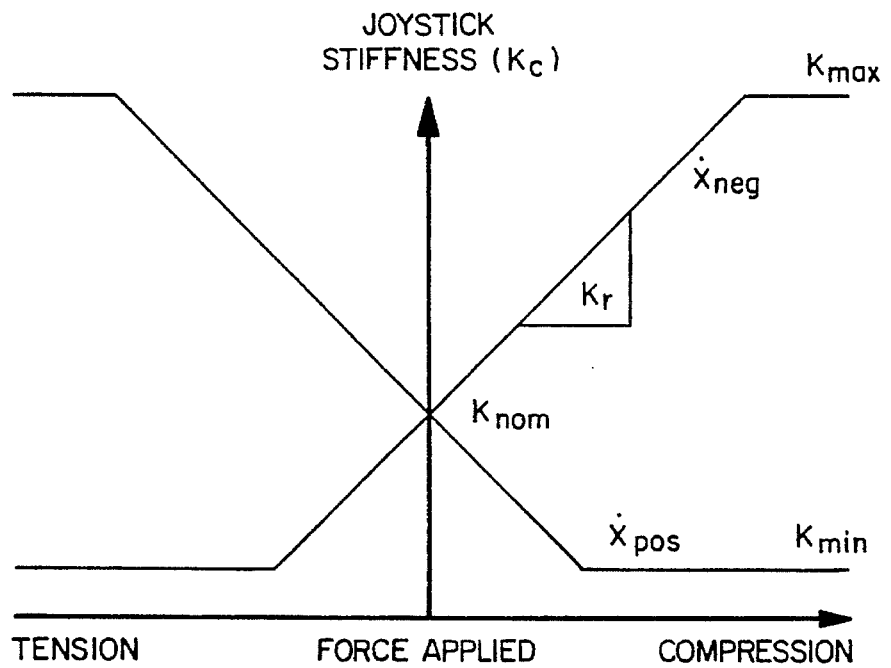
FIGS. 4 and 5 are more detailed flow diagrams of one form of the force feedback system of the present invention.

The relationship of hand controller stiffness factor $K_c$ over the load range to be applied to the end point 28 of the arm being controlled is illustrated in FIG 4. It will be apparent that the factor $K_c$ changes dependent on the direction of the load or forces on the end point 28. In the illustration the stiffness factor $K_c$ is obtained by simply scaling the force $f_e$ at the end point 28 using linear scaling i.e. $K_r$=a constant, it is also possible to vary the scaling factor based for example on load or end point force to skew the relationship as desired. The linear relationships shown are preferred.

It will be apparent that in some situations the end point force $f_e$ will be in the same direction that the hand controller is attempting to move the end point 28 i.e. the stiffness factor $K_c$ will be less than $K_{nom}$, but the system is controlled so that the minimum force tending to move the manual controller to its datum position will never be less than stiffness factor $K_{min}$ (multiplied by the displacement d of the hand controller).

Once the stiffness factor $K_c$ is determined as a function of the force $f_e$ as above described the force to be applied to the joystick to provide feedback of end point forces to the operator is determined (see box 44 in FIG. 3) based of the factor $K_c$ and the displacement d of the joystick in the desired direction of movement.

$$f_m = K_c * d \quad (3)$$

where $f_m$=stiffness force feedback force resisting movement of the joystick in the direction controlling end point velocity in the desired x, y or z direction at deflection d of the manual controller or joystick from its datum in the direction controlling end point velocity in the desired direction.

$K_c$=stiffness factor based on the sensed end point force $f_e$ in the desired end point direction x, y or z and scaling factor $K_r$.

d=the displacement of the joystick in the direction controlling end point velocity in the desired x, y or z direction.

It will be apparent that the components of the end point force $f_e$ in each direction x, y and z of movement of the end point 28 are determined and used to determine feedback forces $f_m$ that are applied to the joystick or member 202 and must be overcome by the operator to move the member 202 to control velocity of the end point 28 in the corresponding direction at the desired rate, so that the force $f_m$ that must be applied by the operator to obtain movement in the desired direction at the desired velocity will reflect the resistance to movement of the end point in that direction.

As above indicated the system must be stable and bounded by practical limits, yet a conventional rate control is stable only for a joystick displacement of 0 i.e. d=0 as in any other position the signal is given to move the end point at a desired velocity. With stiffness control any force applied to the joystick or other manual controller will result in a finite movement of the joystick which in turn would result in attempted endpoint movement and even an infinite end point force would be insufficient to move the manual controller (joystick) to the zero or datum position. Thus a finite deadband zone 216 surrounding the zero position or datum position is defined. This zone may be defined by setting a preselected minimum force that must be exerted to move the joystick sufficiently from its datum or zero position i.e through the deadband zone 216 i.e. to the boundary of the deadband zone 216.

This deadband zone 216 helps to ensure that the situation at the endpoint does not cause the joystick to act incorrectly, for example, to overshoot and apply an unwanted control signal to the computer. For example, if the operator lets go of the handle the feedback stiffness is set so that it will always return the joystick to the deadband zone 216 and end point 28 motion will stop.

The size of the deadband area is preferably set by a selected force $f_{m(db)}$ with which the operator is comfortable based a scaled value of the endpoint force $f_e$ and the displacement of the joystick to reach the boundary of the deadband zone 216 i.e. the size of the deadband zone in any direction under zero end point load conditions is set based on;

$$d_{(db)} = f_{m(db)} / K_{(nom)} \quad (4)$$

where $d_{(db)}$=displacement from the datum position to the outer boundary of the deadband zone $f_{m(db)}$=operator force on the joystick required to leave the deadband zone.

$K_{nom}$=stiffness factor tending force the hand control to its datum position under conditions where the end point force is zero.

The nominal stiffness factor which will be encountered when initiating movement of the end point when there is no end point load namely $K_{nom}$ is used when setting the deadband but it will be apparent that the actual size of the deadband will vary depending on the load $f_e$ at the endpoint i.e. since the force $f_{m(db)}$ is preselected and thus constant the dimension $d_{(db)}$ varies with $K_c$ which in turn is dependent on $f_e$.

Figure 5:
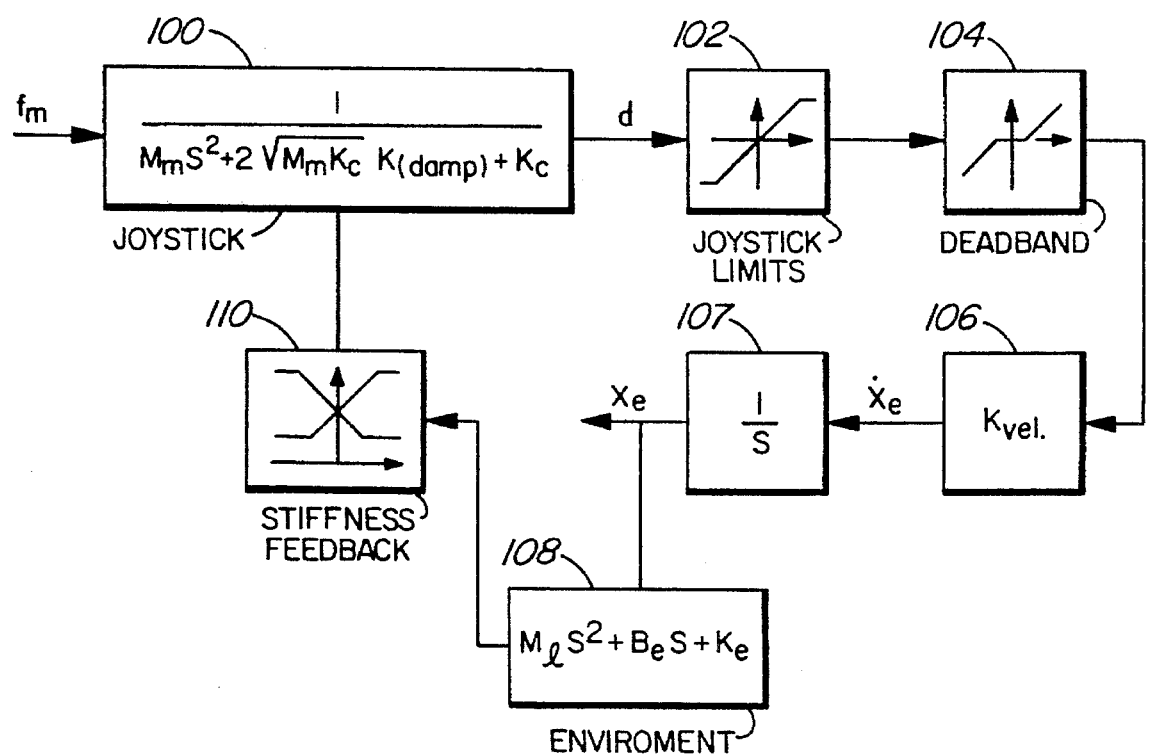

Referring to FIG. 5 the system of the present invention is illustrated in greater detail. The force applied by the operator $f_m$ is applied to the joystick and the various operating parameters of the system are calculated by the computer 34 as indicated at 100 wherein $m_m$=mass of the joystick; s=the Laplace operator; $K_{(damp)}$=a damping factor for the hand controller to be set in the normal manner and d is the corresponding displacement of the hand controller for force $f_m$.

The joystick limits $K_{min}$ and $K_{max}$ are applied as indicted at 102 as is the deadband $d_{(db)}$ as indicated at 104 and the velocity control is applied as indicated at 106 and the movement of the endpoint 28 as indicated by $x_e$ is determined as indicated at 107. The environment of the endpoint 28 is the determined i.e. the forces as determined for example by the sensor 30 to define $f_e$; the mass $m_l$ of the load; and the damping factor $B_e$ are applied as indicated at 108 and then the stiffness factor $K_c$ is defined as indicated 110 and this factor $K_c$ use to define the force feedback force applied to the joystick.

In the application of the present invention the factor $K_r$ was set at 1.5; $K_{nom}$ was set at 4 kN; $K_{min}$=2 kN; and $K_{max}$=30 kN for the specific joystick being used which had a maximum available range of forces that could reasonably be applied of up to 35 kN. Obviously the actual end point forces will be equipment specific and the operating force may be operator specific so the values of $K_r$, $K_{nom}$, $K_{mim}$ and $K_{max}$ may vary significantly from machine to machine and possibly from operator to operator.

Having described the invention modifications will be evident to those skilled in the art without departing from the scope of the invention as defined in the appended claims.

We claim:

1. A method for applying force feedback to a manual control member of a velocity control system for an arm having an end point comprising determining the degree of displacement (d) of said manual control member from a datum position wherein no velocity commands are provided to move said arm, said displacement of said member defining the velocity signal desired by the operator, determining forces ($f_e$) at said end point, defining a stiffness factor ($K_c$) as a function of said determined forces ($f_e$) at said end point, defining a feedback force ($f_m$) based on the product of said stiffness factor ($K_c$) and a function of said determined degree of displacement (d) of said manual control member from said datum position, and applying said feedback force ($f_m$) to said manual control member to bias said manual control member toward said datum position.

2. A method as defined in claim 1 wherein said stiffness factor ($K_c$) is obtained by scaling said determined end point forces $f_e$.

3. A method as defined in claim 1 further comprising providing a deadband zone $d_{(db)}$ wherein movement of said manual member does not result in movement of said end point, said deadband zone $d_{(db)}$ surrounding said datum position.

4. A method as defined in claim 2 further comprising providing a deadband zone $d_{(db)}$ wherein movement of said manual member does not result in movement of said end point, said deadband zone $d_{(db)}$ surrounding said datum position.

5. A force feedback velocity control system for applying force feedback to a manual displaceable member for controlling an arm having an end point comprising a computer means, a master controller means, said manual displaceable member controlling said master controller, said master controller being mapped to provide a datum position of said manual displaceable member wherein no velocity signals are sent to said computer when said member is in said datum position and to adjust the velocity signal to said computer means to increase the velocity of said end point in a any one direction in an amount dependent on the degree of displacement (d) of said displaceable member from said datum position in the direction of movement of said member controlling movement of said end point in said one direction, means for applying feedback forces ($f_m$) to said manual displaceable member to resist movement of said manual displaceable member away from said datum position, means to provide signals representing end point forces ($f_e$) on said arm adjacent said end point, means to define a stiffness factor ($K_c$) as a function of said end point force ($f_e$) and generate force feedback signals based on said stiffness factor ($K_c$), means for modifying said means for applying stiffness to modify said feedback force ($f_m$) in said direction of movement controlling velocity of said end point in said one direction based on the product of said stiffness factor ($K_c$) and a function of displacement (d) of said member from said datum in said direction of movement of said member controlling velocity of said end point in said one direction.

6. A system as defined in claim 3 wherein a deadband zone ($d_{(db)}$) wherein movement of said manual displaceable member produces no changes in velocity of said end point encircles said datum position.

7. A method as defined in claim 1 wherein said stiffness factor $K_c$ is determined using the formula $$K_c = K_{nom} + f_e K_r$$

where
$K_{nom}$ is the stiffness factor tending to force the manual control member to said datum position when $f_e$ is zero
$K_r$ is a scaling factor.

8. A method as defined in claim 3 wherein said deadband zone is determined by $$d_{(db)} = f_{m(db)} / K_{nom}$$

where
$d_{(db)}$ is the displacement of said manual control member from said datum position to the outer boundary of said deadband zone
$f_{m(db)}$ is the biasing force on said manual controller member that must be overcome to leave said deadband zone.

9. A method as defined in claim 8 wherein said stiffness factor $K_c$ is determined using the formula $$K_c = K_{nom} + f_e K_r$$

where
$K_{nom}$ is the stiffness factor tending to force the manual control member to said datum position when $f_e$ is zero
$K_r$ is a scaling factor.

10. A system as defined in claim 5 wherein said stiffness factor $K_c$ is determined using the formula $$K_c = K_{nom} + f_e K_r$$

where
$K_{nom}$ is the stiffness factor tending to force the manual control member to said datum position when $f_e$ is zero
$K_r$ is a scaling factor.

11. A system as defined in claim 6 wherein said deadband zone is determined by $$d_{(db)} = f_{m(db)} / K_{nom}$$

where
$d_{(db)}$ is the displacement of said manual control member from said datum position to the outer boundary of said deadband zone
$F_{m(db)}$ is the biasing force on said manual controller member that must be overcome to leave said deadband zone.

12. A system as defined in claim 11 wherein said stiffness factor $K_c$ is determined using the formula $$K_c = K_{nom} + f_e K_r$$

where
$K_{nom}$ is the stiffness factor tending to force the manual control member to said datum position when $f_e$ is zero
$K_r$ is a scaling factor.

* * * * *